UNITED STATES PATENT OFFICE.

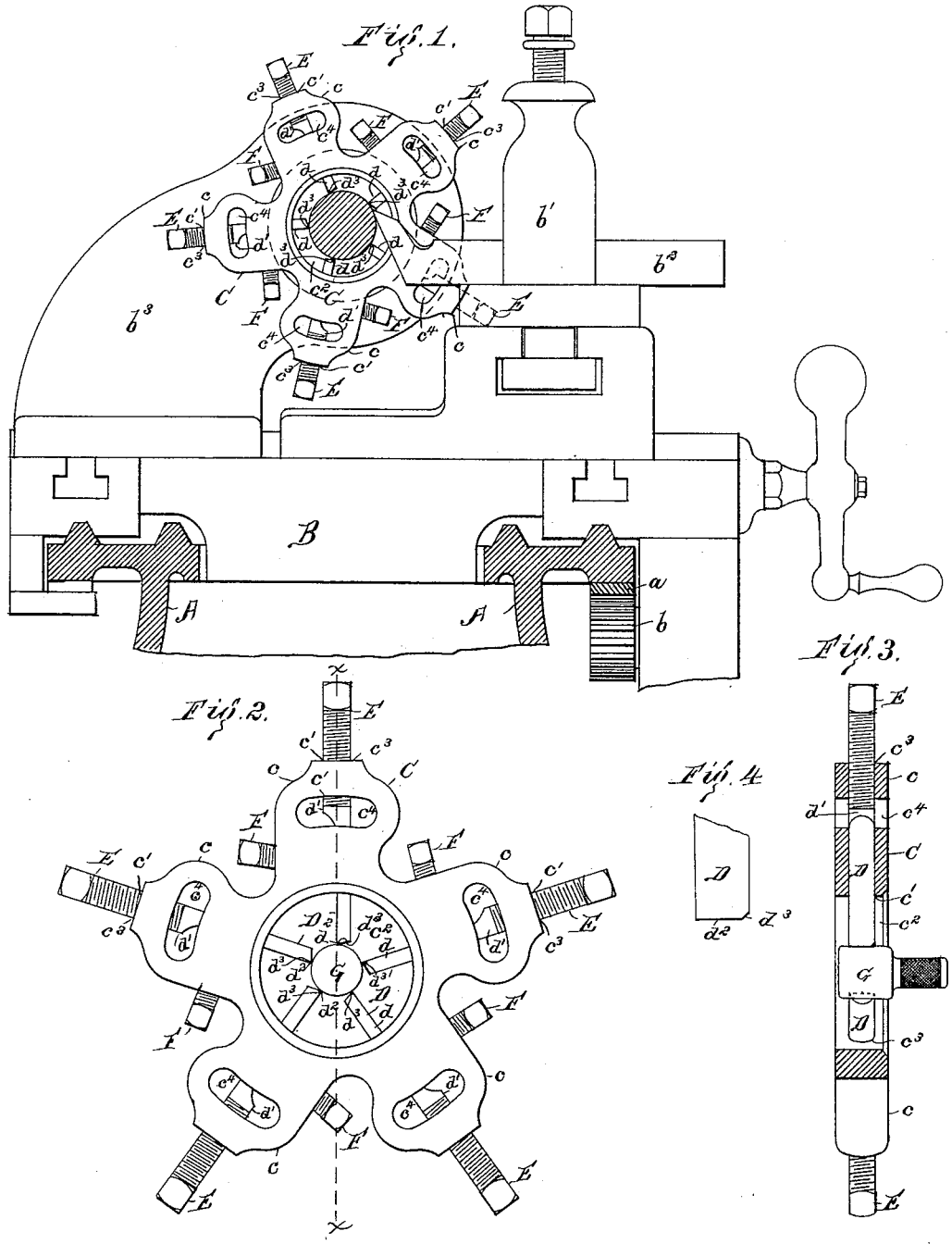

DAVID H. SHATTUCK, OF WESTFORD, MASSACHUSETTS.

ADJUSTABLE SIZER FOR SHAFTING.

SPECIFICATION forming part of Letters Patent No. 386,354, dated July 17, 1888.

Application filed February 29, 1888. Serial No. 265,776. (No model.)

*To all whom it may concern:*

Be it known that I, DAVID H. SHATTUCK, a citizen of the United States, residing in Graniteville, in the town of Westford, in the county of Middlesex and Commonwealth of Massachusetts, have invented a certain new and useful Improvement in Adjustable Sizers for Shafting, of which the following is a specification.

My invention relates to adjustable sizers for shafting, and has for its principal object to furnish means of making the finishing or sizing cut at the same time that the roughing cut is made in turning shafting or similar work.

In the accompanying drawings, Figure 1 is a vertical transverse section of a lathe-bed or shears, a carriage-rack secured to said bed under the front side thereof, and a shaft being turned and finished therein, and an elevation of the carriage and tool-post, the lathe tool, the follower-rest, and my adjustable sizer, showing the left sides of these parts or sides toward the head-stock of the lathe; Fig. 2, a left side elevation of my improved sizer and a cylinder-gage; Fig. 3, a section on the line $x\ x$ in Fig. 2 of said sizer and gage, Fig. 4 an enlarged front elevation of one of the cutters of the sizer.

The bed or shears A, carriage B, carriage-rack $a$, secured to the bed or the under side of the front part of the same and engaged by the pinion $b$; the tool-post $b'$, secured on said carriage; the lathe-tool $b^2$, secured in said tool-post, and the follower-rest $b^3$, secured on said carriage and traveling therewith, are or may be of any usual construction and operation suitable for turning shafting or similar cylindrical work. Usually shafting is twice turned, a heavy or thick chip being first turned off, and subsequently a thinner finishing-chip, two operations being thus required, a steady-rest or follower-rest being frequently used to surround the shaft and to support the same and to prevent the same from being deflected by the pressure of the cut.

The sizer herein described consists of a frame or head, C, of the shape shown, the same being substantially a ring provided with radial bosses $c$, about five in number, more or less. These bosses are each drilled through radially at $c'$ into the central opening, $c^2$. Within the radial holes $c'$ are placed the radial cutters D, each cutter being formed from a round bar of steel of a diameter to fill said holes and milled to a half-round bar for nearly its entire length at $d$, the upper end of the cutter for about a sixteenth of an inch being left round, as shown at $d'$, to leave a better bearing-surface for the adjusting-screw E, which thrusts radially against the outer end of said cutter and turns in the hole $c'$, the outer portion, $c^3$, of which hole is tapped or correspondingly threaded, as shown in Fig. 3. The head C is provided between the threaded and unthreaded portions of each hole $c'$ with a concentric arc-shaped slot, $c^4$, which improves the appearance of the head, and also serves to relieve the taps which thread said holes $c'$. The cutters are adjusted inwardly by turning the screws E so as to bring all the cutting-edges $d^2$ of said cutters to the circle which equals the required finished circumference of the shafting to be turned, and when so adjusted are rigidly secured in place by set-screws F, one of which turns in a threaded hole in each boss and thrusts against the flat side of one of the cutters. The cutters are ground so that the ends of their cutting-edges are at right angles to the flat rear face of the head C, except that the sides of said cutting-edges nearest the head-stock are beveled off, as shown at $d^3$ in Fig. 4, to allow the end of the shaft to enter the sizer.

In use the sizer is placed in front of the follower-rest, and is fed along by the movement of said rest, and is prevented from revolving by one of said bosses, $c$, or one of said adjusting-screws, E, striking against the carriage, no means being necessary to center the sizer with the axis of the shafting, because it centers itself. It is not therefore necessary that the cutters should all project equally inward toward the center of the head, but only necessary that the cutting-edges of the cutters should be in the circumference of a circle equal to the circumference of the finished shafting.

The cutters may be quickly and accurately adjusted to position by setting them against an accurately-made cylindrical gage, G, of hardened steel—such as is shown in Figs. 2 and 3—of the desired diameter of the finished shafting.

I claim as my invention—

1. The sizer herein described, consisting of a head having an opening to admit a piece of shafting, and cutters secured in said head at equal angular distances from each other and projecting into said opening and adapted to be held from turning, and to be carried by the follower-rest, or by an arm projecting vertically from the lathe-carriage and to center itself automatically with said shafting, as and for the purpose specified.

2. The combination of the head provided with radial holes having screw-threaded outer portions, and with a central opening connecting with said holes, cutters arranged in said holes and extending into said opening, means, substantially as described, of holding said cutters, and adjusting-screws turning in the threaded portions of said holes and thrusting against the outer ends of said cutters, as and for the purpose specified.

In witness whereof I have hereunto set my name, this 16th day of February, A. D. 1888, in the presence of two attesting witnesses.

DAVID H. SHATTUCK.

Witnesses:
ALBERT M. MOORE,
KIRKLEY HYDE.